(12) United States Patent
Wilson

(10) Patent No.: US 10,528,215 B2
(45) Date of Patent: Jan. 7, 2020

(54) ARRANGEMENT OF GRAPHIC ELEMENTS BASED ON SHAPE LOCATIONS

(71) Applicant: GOOGLE LLC, Mountain View, CA (US)

(72) Inventor: Andrew Wilson, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 84 days.

(21) Appl. No.: 15/630,159

(22) Filed: Jun. 22, 2017

(65) Prior Publication Data
US 2018/0373394 A1 Dec. 27, 2018

(51) Int. Cl.
G06F 3/048 (2013.01)
G06F 3/0481 (2013.01)
G06F 3/0484 (2013.01)
G06F 3/0482 (2013.01)
G06F 3/0483 (2013.01)

(52) U.S. Cl.
CPC .......... G06F 3/0481 (2013.01); G06F 3/0482 (2013.01); G06F 3/0483 (2013.01); G06F 3/0484 (2013.01); G06F 2203/04803 (2013.01)

(58) Field of Classification Search
CPC ... G06F 3/0481; G06F 3/04845; G06F 3/0486
See application file for complete search history.

(56) References Cited

U.S. PATENT DOCUMENTS

| 5,704,028 A * | 12/1997 | Schanel | G06F 3/04845 345/440 |
| 2009/0319948 A1* | 12/2009 | Stannard | G06F 8/34 715/810 |
| 2014/0164991 A1* | 6/2014 | Kim | G06F 3/0481 715/794 |

FOREIGN PATENT DOCUMENTS

EP 2741201 A2 6/2014

OTHER PUBLICATIONS

International Search Report and Written Opinion for PCT Application No. PCT/US2018/027772, dated Jul. 23, 2018. 18 pages.

* cited by examiner

*Primary Examiner* — Justin S Lee
(74) *Attorney, Agent, or Firm* — Botos Churchill IP Law LLP

(57) ABSTRACT

A system and method is provided for locating graphic elements. In one aspect, areas in a GUI are defined based on a defining shape. For example, a GUI may be divided into portions, where each portion is associated with a defining line and includes the locations in the GUI that are closer to the defining line than any other defining line. When a user selects a location within a defined area, the system may place a graphic element at a location containing all or part of the defined area or its associated defining line. Other graphic elements may be arranged relative to the placed element.

20 Claims, 13 Drawing Sheets

ARRANGEMENT OF GRAPHIC ELEMENTS BASED ON SHAPE LOCATIONS

BACKGROUND

In certain graphical user interface (GUI) systems, portions of a GUI (a "target area") may be associated with particular actions. For example, dragging and dropping a graphic element to the top edge of a screen or left half of the screen may result in the element expanding to cover the entire or left half of the screen, respectively.

The boundary of a target area associated with a particular action may be static. For instance, the location of the target area relative to the edges or center of the GUI may be fixed.

The location of a target area may be defined by the location of its boundary. By way of example, a vertical or horizontal rectangular target area may be represented in memory by the x and y pixel coordinates of the area's top left and bottom right corners, and determining whether a location is within the area may include comparing the pixel coordinates of the location to the pixel coordinates of the corners. A circular target area may be represented in memory by the x and y pixel coordinate of its center and its radius, and determining whether a location is within the target area may include determining whether the distance between the location and the center is less than the radius.

If a target area is stored and processed based on the location of its boundary, a complex boundary may require more memory and processing resources than a simple boundary. For instance, if a target area's boundary includes multiple curves and lines meeting at acute and obtuse angles, storing the locations of the curves and lines may require storing many different coordinates. Moreover, determining whether a location is within a target area, or changing the location of the target area itself, based on the location of its boundary may require substantially more processing resources than a rectangular or circular boundary as described above.

SUMMARY

Aspects of the technology described herein relate to techniques for storing target areas, determining whether a location is within a target area, changing the location of a target area, and taking and displaying actions in connection with such determinations or changes. For example, aspects of the technology relate to storing and processing a target area with a relatively complex border as a single line.

The technology described herein may be used to enhance storage and processing resources of computing devices. For instance, user devices often have limited storage, power and processing resources. Decreasing the memory required to store target areas with complex boundaries can increase the memory available for other purposes. Decreasing the processing resources required to determine whether a location is within a target area, or decreasing the amount of data that must be modified to change a target area's location, can save power and meet a user's requirements more quickly. Processing GUI-related information efficiently can also result in faster communication between a user device and a computing device providing the graphic elements to be displayed, since the information to be communicated can be reduced.

One aspect of the technology described herein relates to a system including one or more computing devices and a memory storing instructions, the instructions being executable by the one or more computing devices. The data includes a first location of a curvilinear first shape relative to a graphical user interface and a second location of a curvilinear second shape relative to the graphical user interface. The instructions include: receiving a selected location relative to the graphical user interface; determining a first distance between the selected location and the closest point on the first shape to the selected location; determining a second distance between the selected location and the closest point on the second shape to the selected location; selecting the first shape when the first distance is shorter than the second distance and selecting the second shape when the first distance is shorter than the second distance; determining a graphic element location based on the location of the selected shape; and providing a graphic element for display on the graphical user interface at the graphic element location.

Another aspect of the technology described herein also relates to a memory storing instructions and data. In this aspect, the data includes a plurality of defining shapes wherein each defining shape has a location and is associated with a portion of a graphic user interface that is based on the location of the defining shape relative to the location of at least one other defining shape. The instructions include: receiving a user-selected location; identifying the defining shape associated with the portion of the graphical user interface in which the user-selected location is associated; determining the location of a first graphic element based on the location of the identified defining shape; determining the location of a second graphic element that does not overlap with the location of the first graphic element; determining a location of a new defining shape based on the location of the first graphic element; storing the location of the new defining shape; and providing the first graphic element and second graphic element for display.

A further aspect of the technology described herein relates to a method using one or more computing devices to: provide a plurality of windows with borders for display; identify a window selected via a user input component; receive a location via the user input component; determine, for each line of a plurality of lines, the shortest distance between the line and the received location; identify, based on the shortest distance determined for each line, the line that is closer to the received location than any other line of the plurality of lines; and provide for display the plurality of windows wherein a border of at least one window is at a location that contains the location of the identified line, and wherein each other window of the plurality of windows is at a location that does not overlap with any other window.

DETAILED DESCRIPTION

Overview

The technology relates to using the location of shapes within a graphical user interface to determine an arrangement of graphic elements on a display. By way of example, a system may store the locations of a plurality of curvilinear shapes, such as horizontal and vertical lines, within a graphical user interface (GUI). As a user drags a window across the GUI, the system may identify the closest line to the cursor and use the location of that line relative to the other lines to determine the location of the window relative to other windows.

Figure 2:
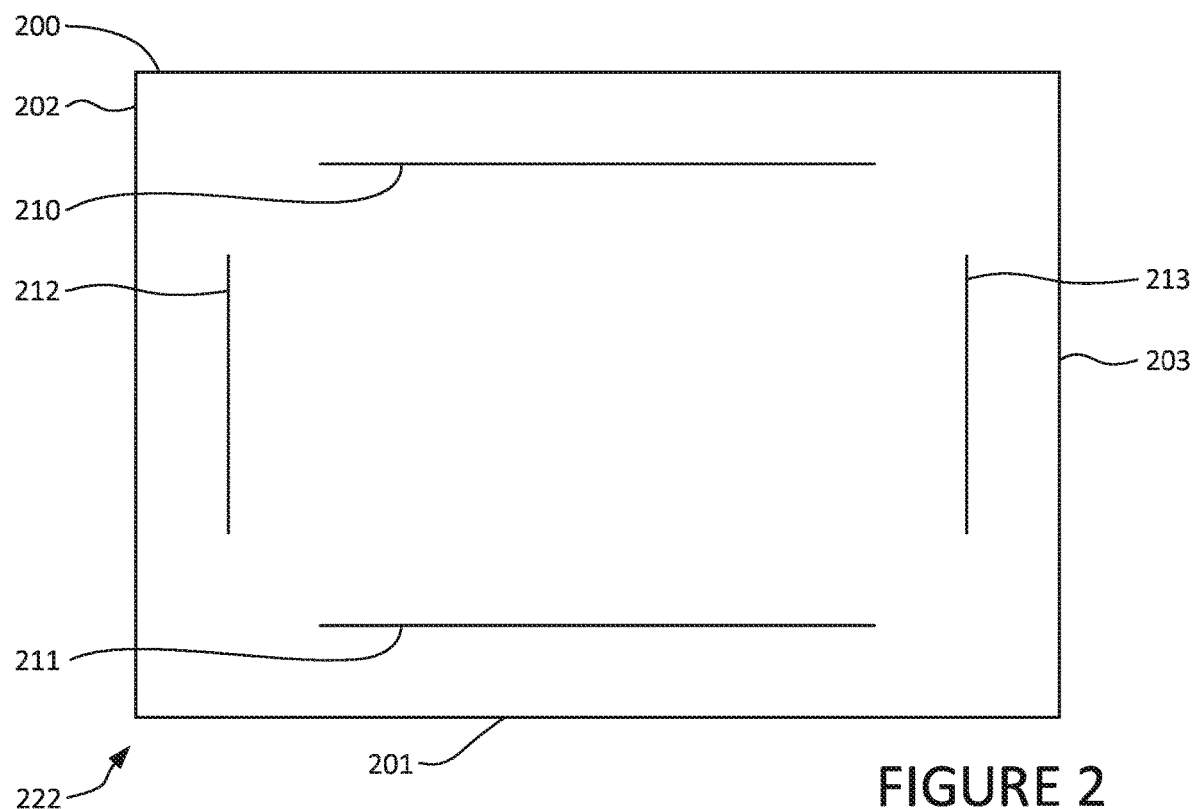
FIG. 2 is an example of a GUI with defining shapes.

FIG. 2 provides an example of using shapes to define target areas. In this example, the shapes include top defining line 210, bottom defining line 211, left defining line 212 and right defining line 213. Each defining line 210-13 is a horizontal or vertical line and the endpoints of defining lines 210-13 are located a non-zero distance away from the outer edges 200-03 of GUI 222. Edges 200-03 are also defining lines. Defining shapes may be visible or invisible.

The target area associated with a defining shape may be based on the location the defining shape as well as other defining shapes. For instance and as shown in FIGS. 3-7, a defining line's target area may be based on its location relative to other defining lines. As shown in FIG. 8, although the boundary of each target area may be relatively complex, the target areas may be represented in memory based solely on the location of the defining shape.

Figure 9:
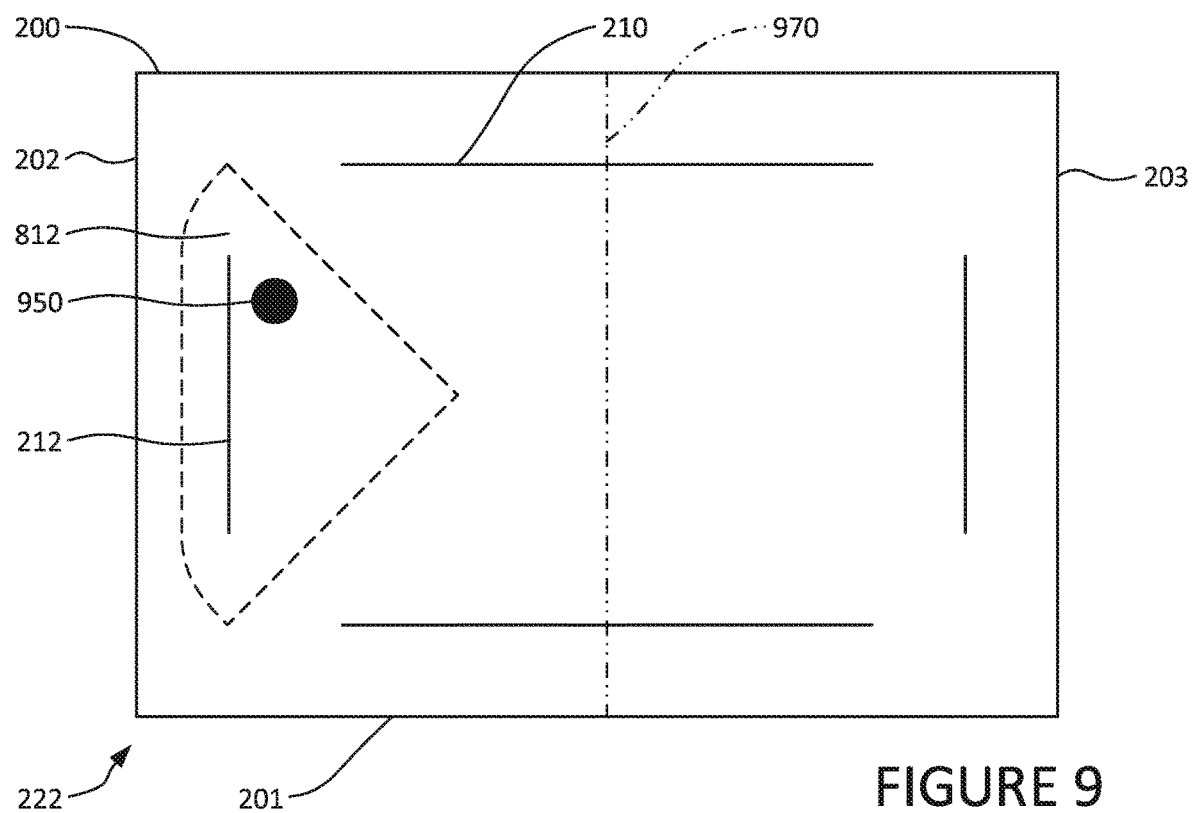
FIG. 9 is an example of identifying a defining shape based on a location.
Figure 10:
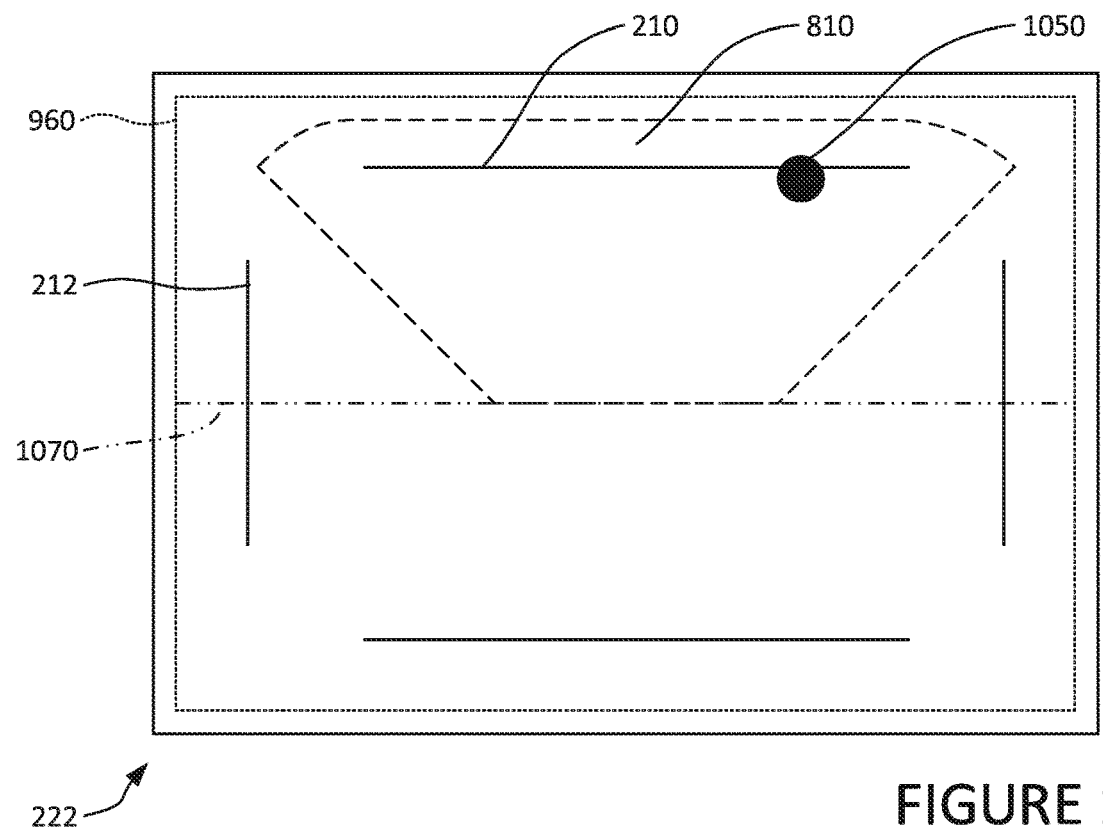
FIG. 10 is an example of identifying a defining shape based on a location.

As shown in FIGS. 9-10, when a user selects a location in the GUI, the system may determine whether the location is within a particular target area by identifying the closest defining shape to the location.

Figure 13:
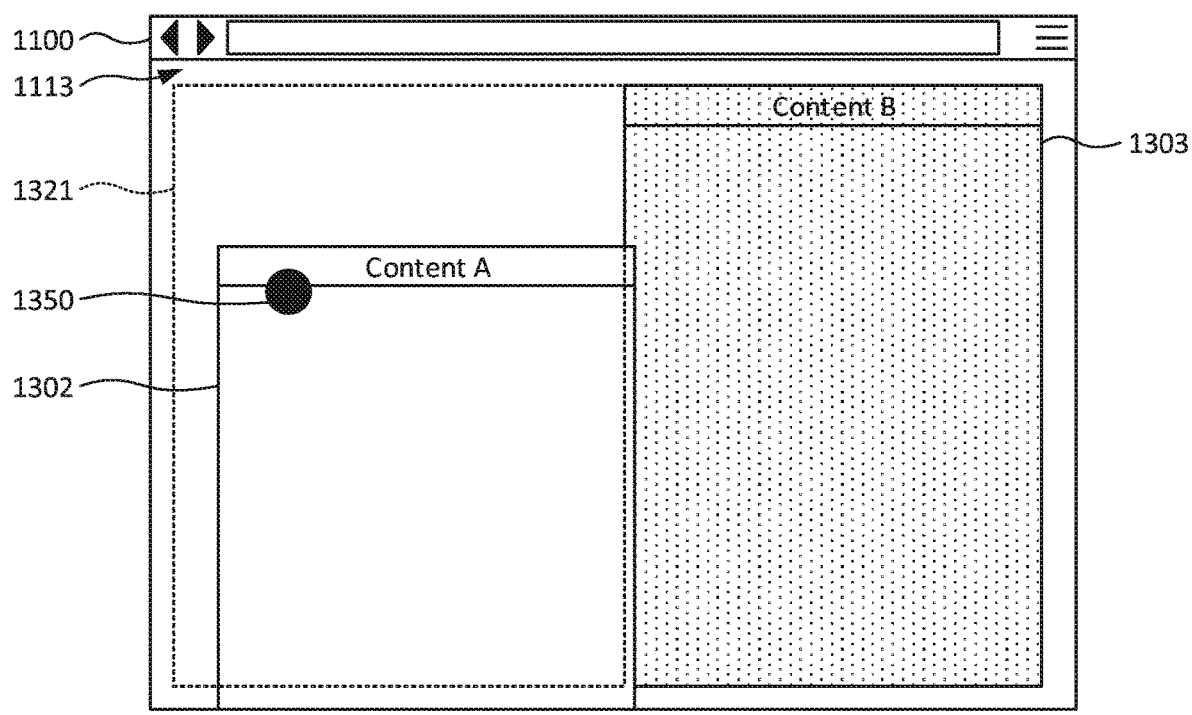
FIG. 13 is an example of a user selecting an arrangement of graphic elements based on the user's selection of a graphic element and its location.
Figure 14:
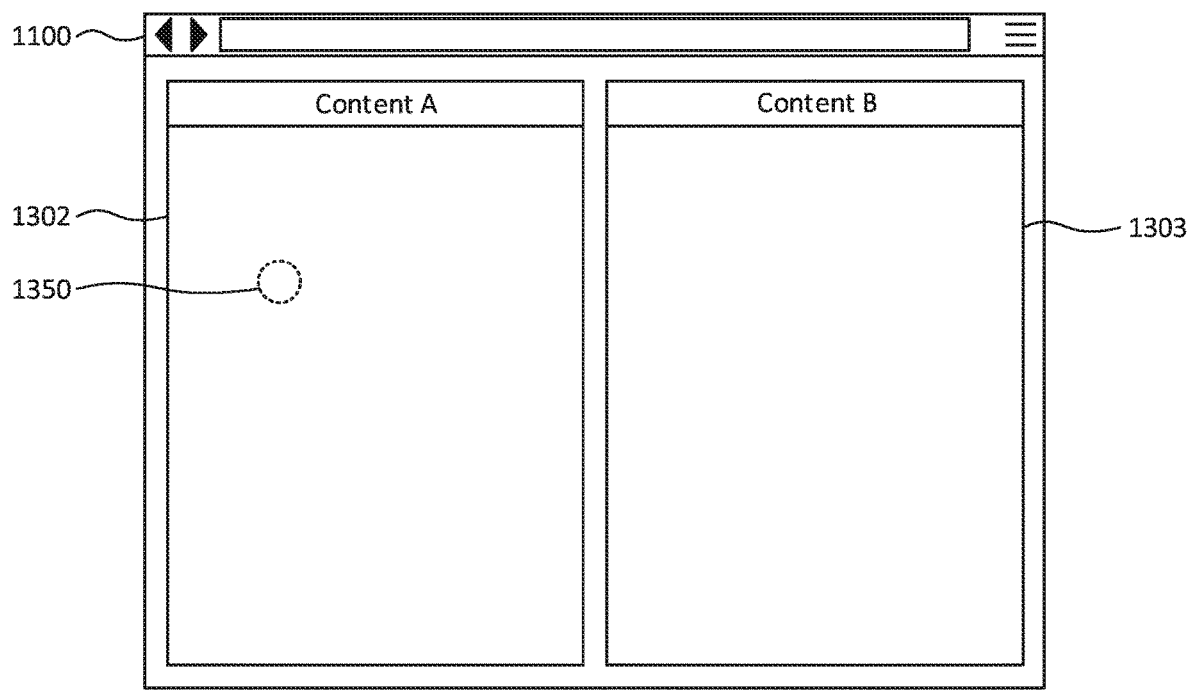
FIG. 14 is an example of a user-selected arrangement of graphic elements.
Figure 15:
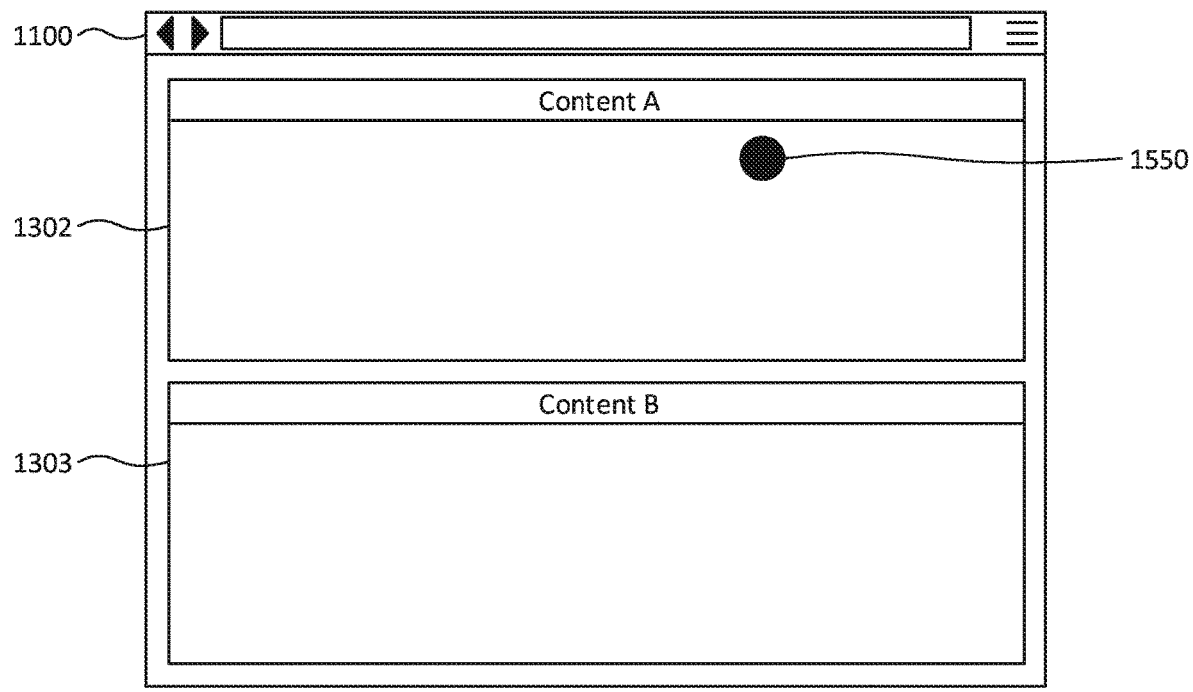
FIG. 15 is an example of a user-selected arrangement of graphic elements.
Figure 20:
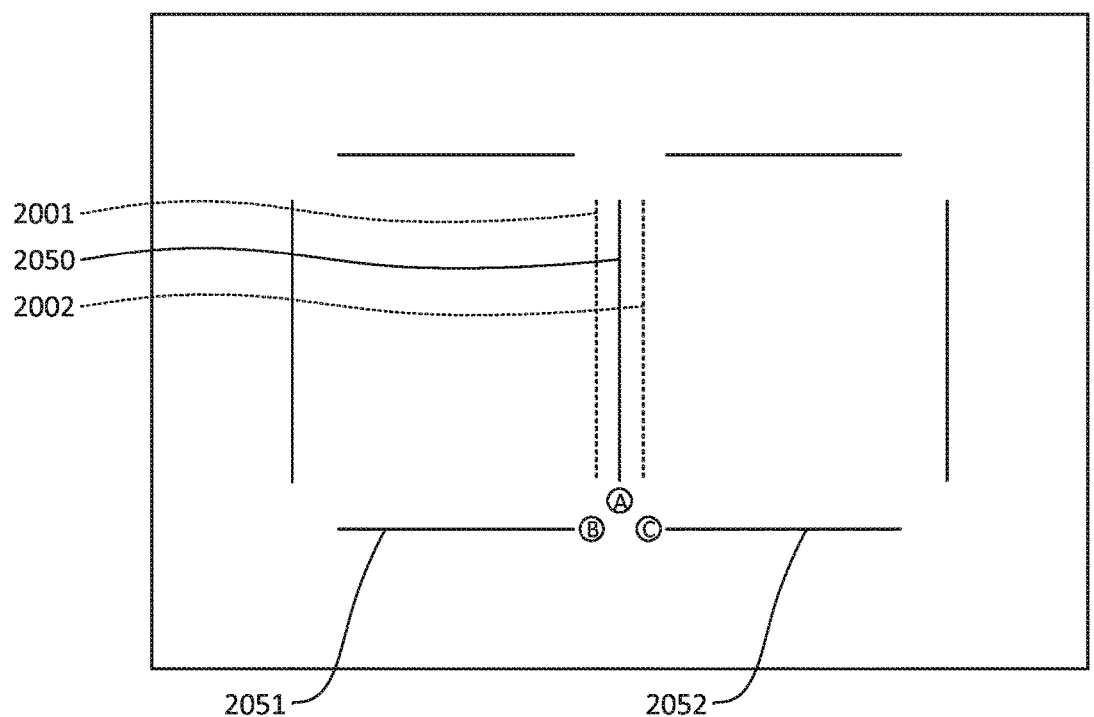
FIG. 20 is an example of dynamically-modified defining shapes.
Figure 21:
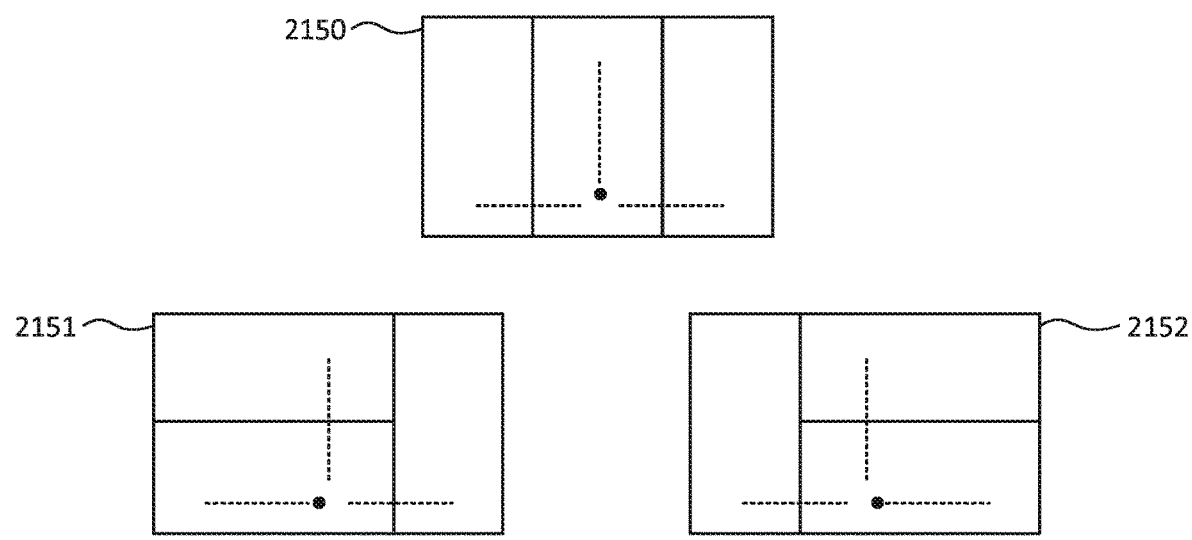
FIG. 21 illustrates examples of user-selected arrangements of graphic elements.

Defining shapes may be used to arrange multiple graphic elements relative to each other. FIGS. 13-15 provide an example of a user selecting different arrangements of graphic elements by dragging a graphic element towards different defining shapes. As shown in FIGS. 20-21, relatively small changes in a user-selected location may result in relatively significant changes in the way graphic elements are arranged.

Figure 11:
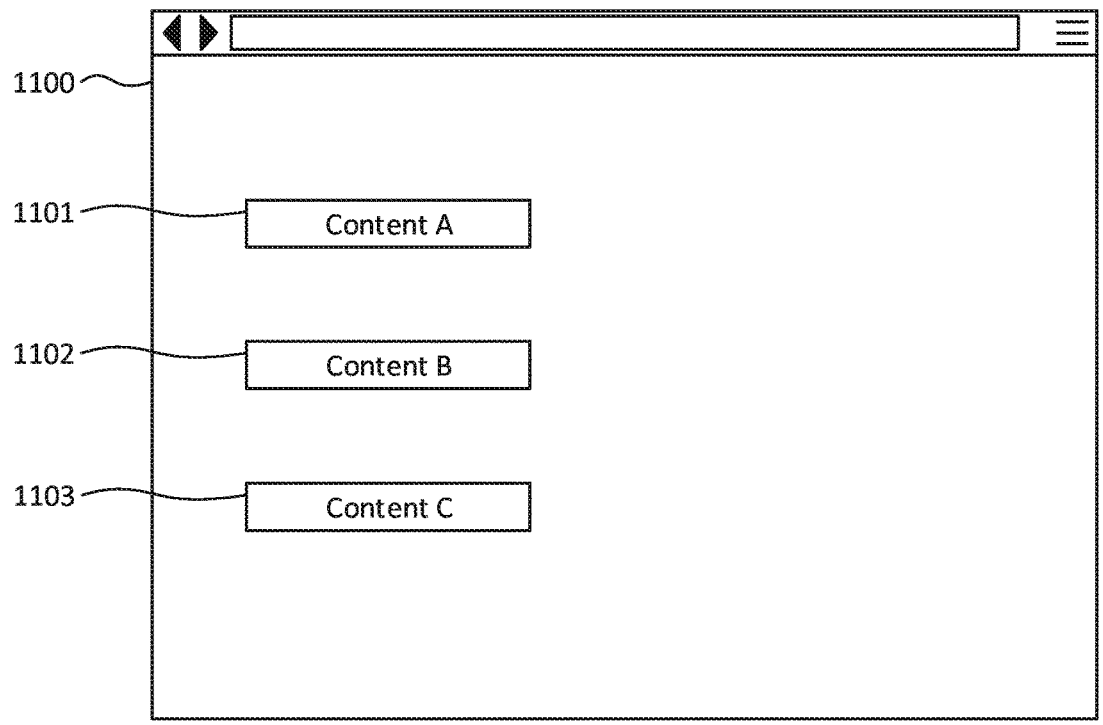
FIG. 11 is an example of displaying content items.
Figure 12:
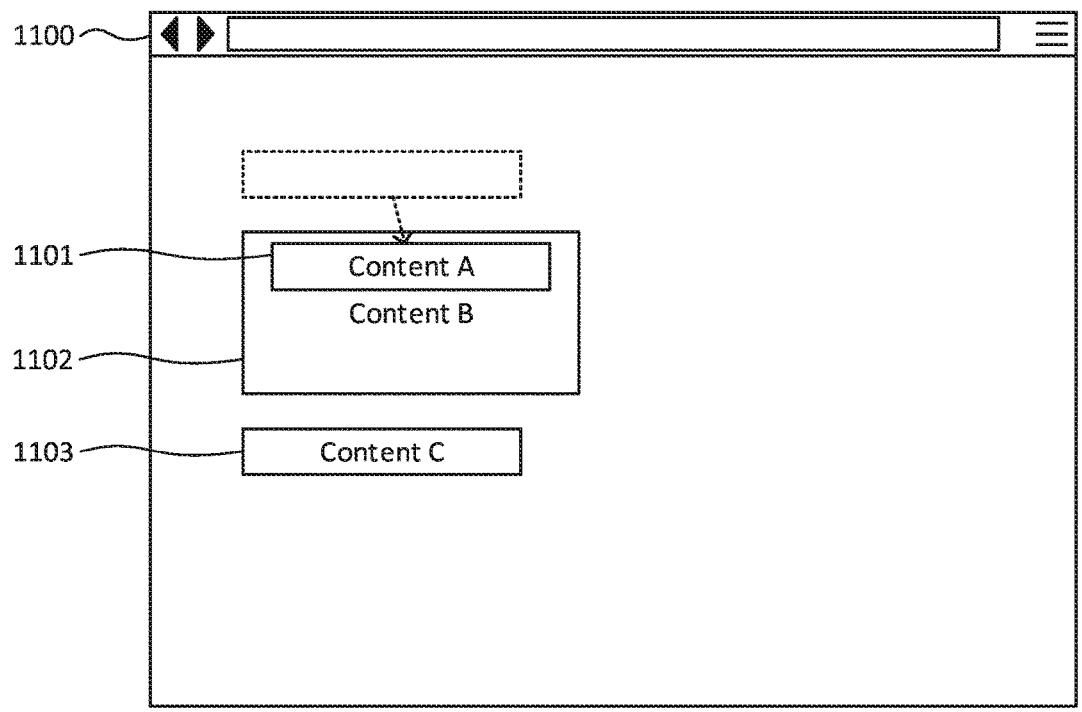
FIG. 12 is an example of a user selecting content items for display.

Graphic elements may display user-selected content. FIGS. 11-12 provide an example of a user selecting multiple content items for display.

Figure 16:
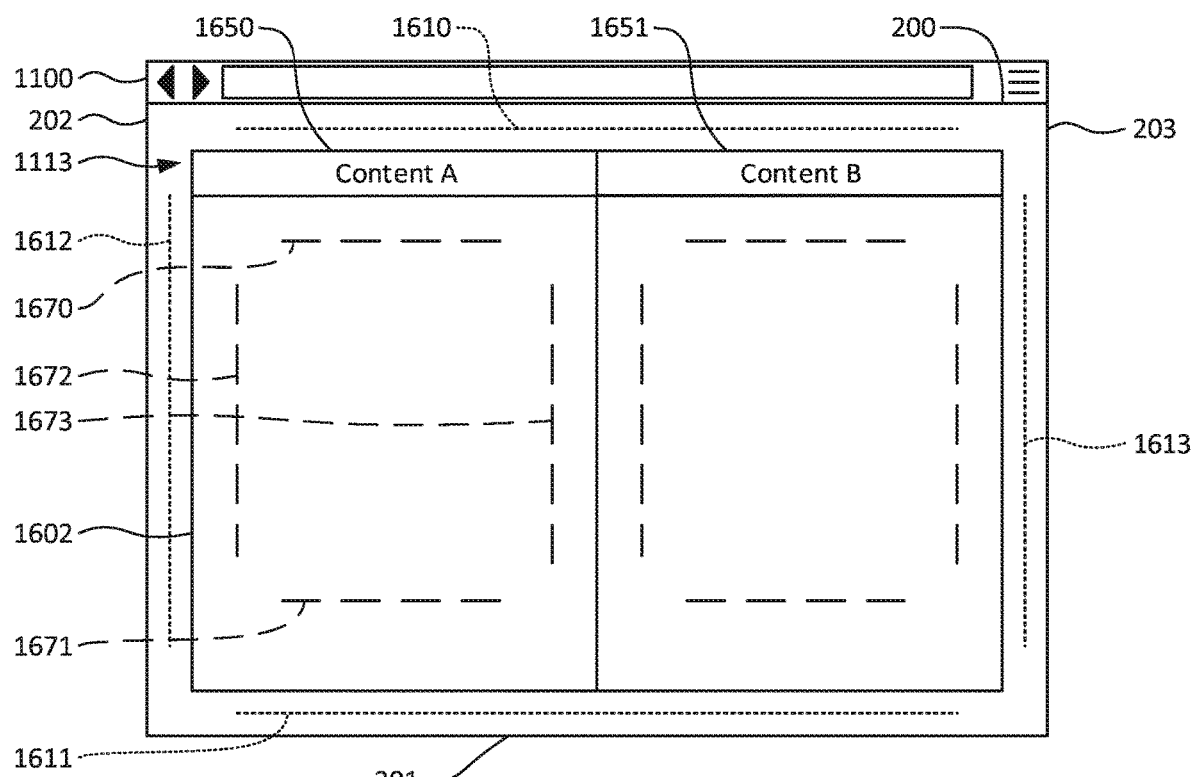
FIG. 16 is an example of defining shapes added in response to a user's arrangement of graphic elements.
Figure 17:
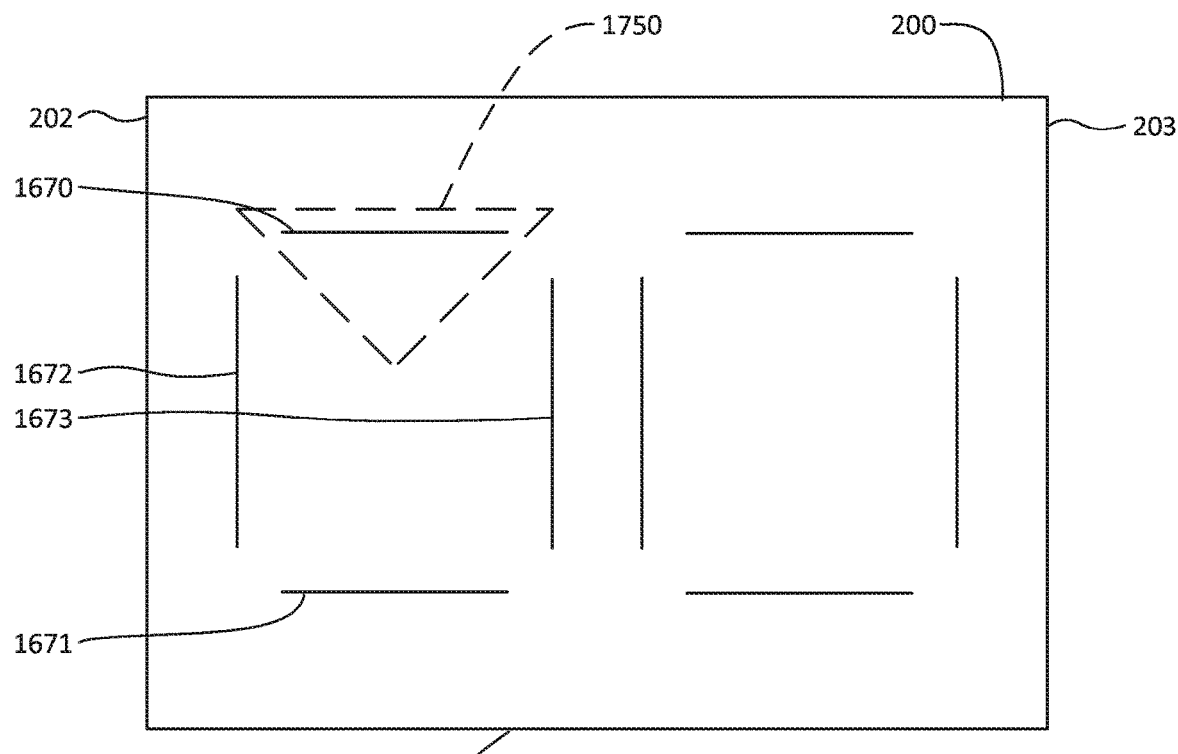
FIG. 17 is an example of a defined area associated with a defining shape added in response to a user's arrangement of graphic elements.
Figure 18:
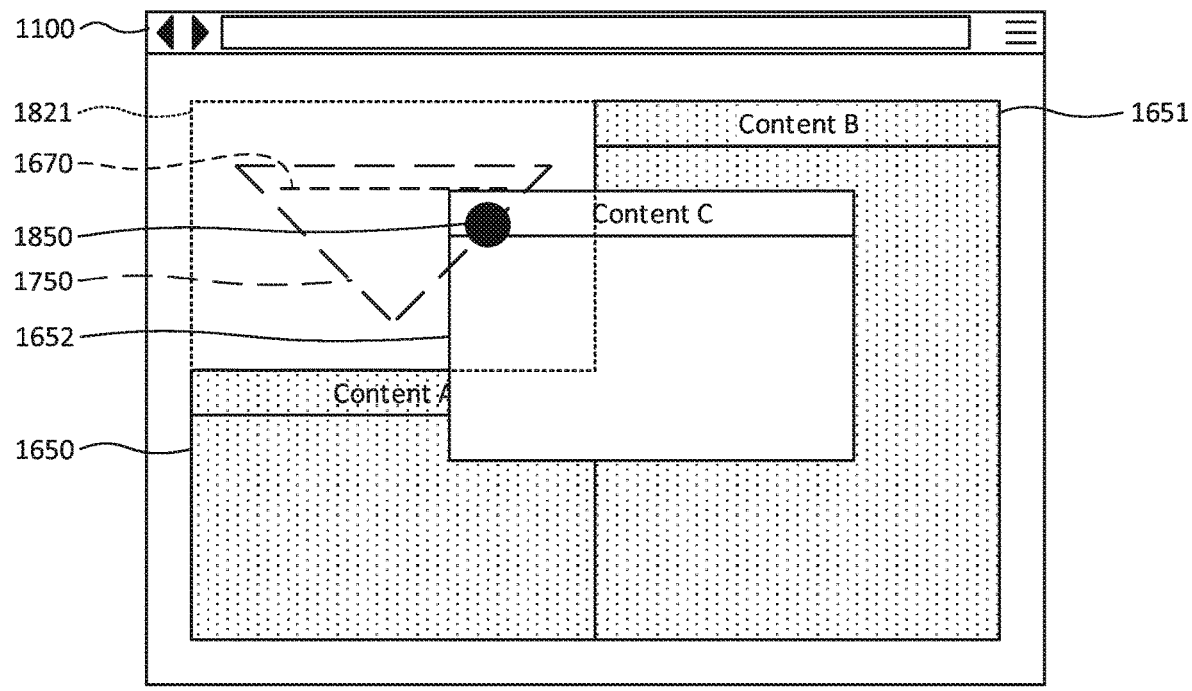
FIG. 18 is an example of a user selecting an arrangement of graphic elements based on the user's selection of a graphic element and its location.
Figure 19:
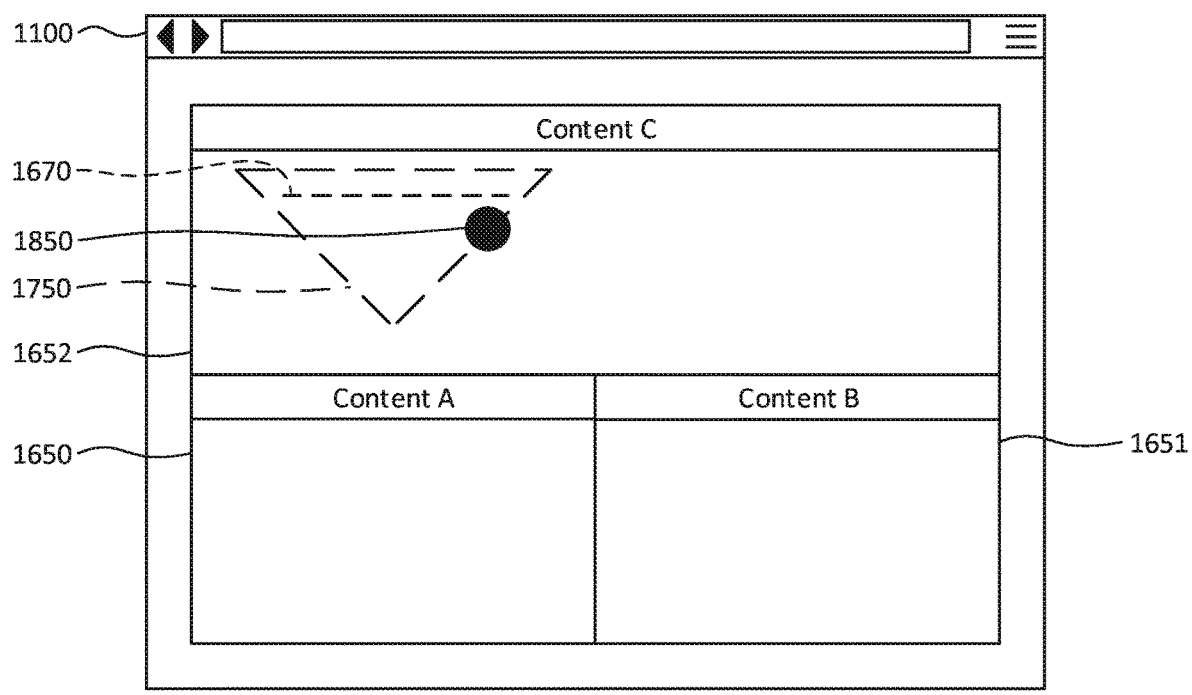
FIG. 19 is an example of a user-selected arrangement of graphic elements.

Defining shapes may be dynamically created and moved. For instance, as shown in FIGS. 16-17, new defining lines and their associated target areas may be associated with a GUI based on the arrangement of graphic elements selected by a user. As shown in FIGS. 18-19, the new defining shapes may be used when another graphic element is provided for display.

Figure 22:
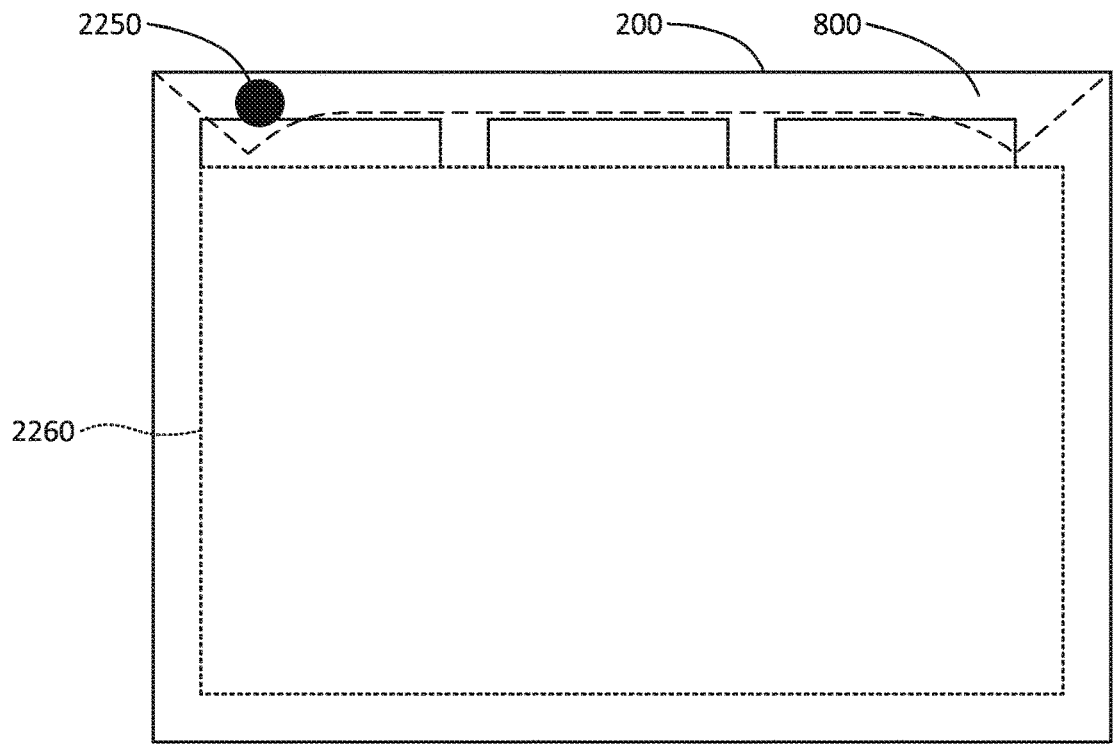
FIG. 22 is an example of a user selecting an arrangement of graphic elements based on the user's selection of a location.
Figure 23:
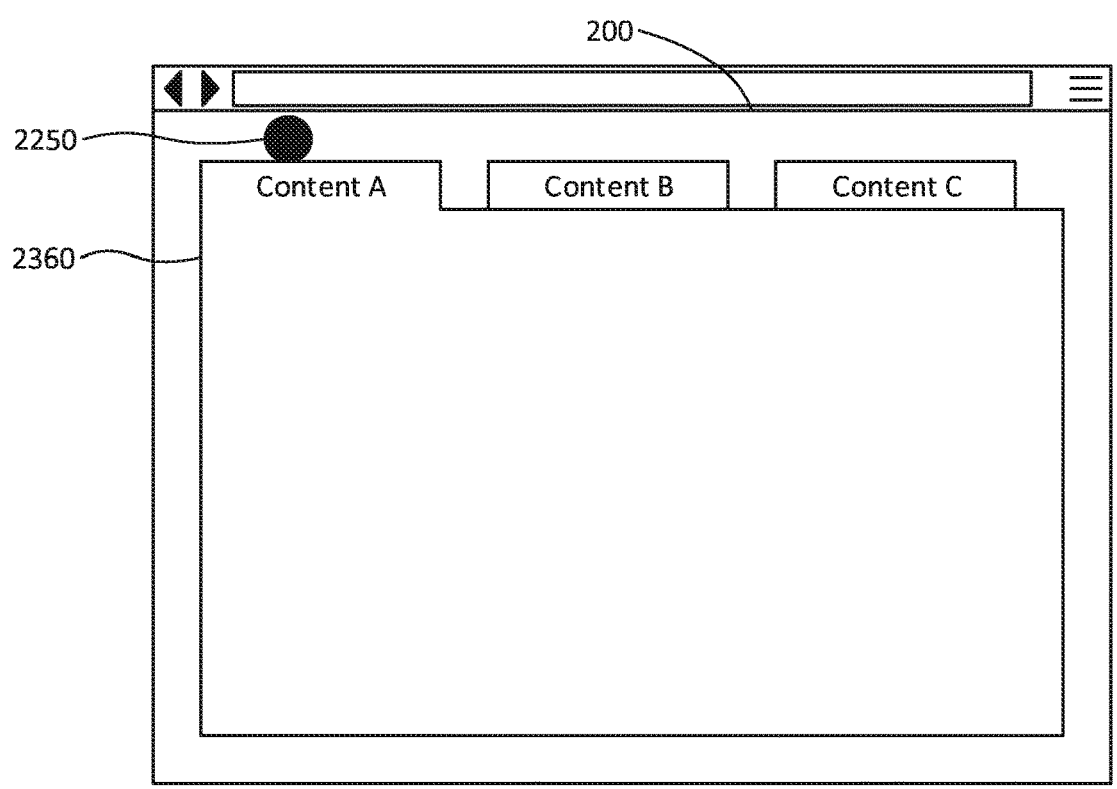
FIG. 23 is an example of a user-selected arrangement of graphic elements.

Defining shapes may be associated with properties that result in certain actions. For instance, as shown in FIGS. 22-23, selecting a location within the target area of the top edge may result in a tabbed-format arrangement.

In that regard, aspects of the system include, but are not limited to, displaying user-selected content in windows in a user-selected arrangement based on defining shapes stored and generated by the system.

Example Systems

Figure 1:
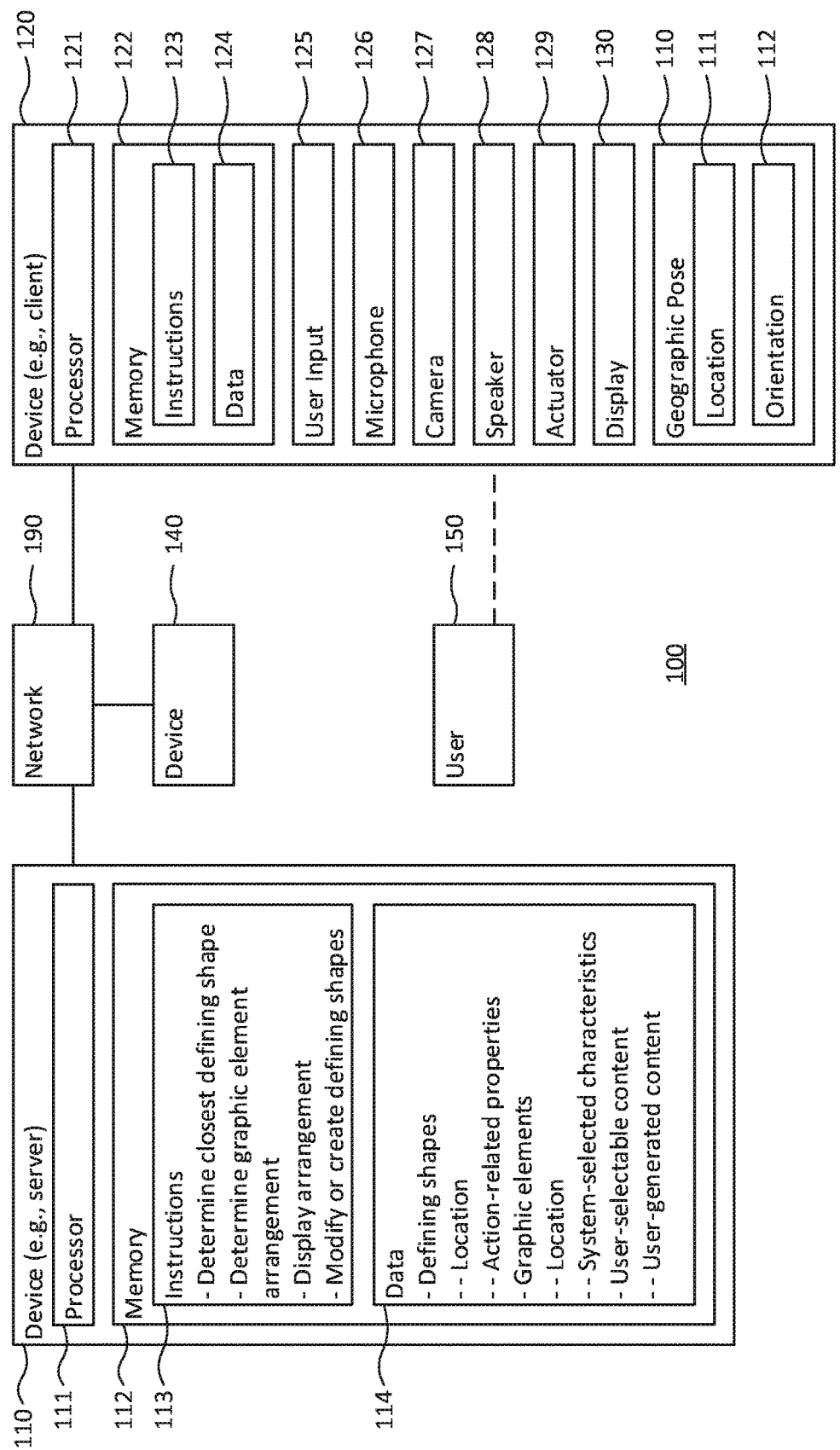
FIG. 1 is a functional diagram of a system in accordance with aspects of the disclosure.

Systems such as those described above may include one or more computing devices. For instance, FIG. 1 provides the example of system 100, which includes computing devices 110, 120 and 140. The computing devices are configured to accept information, perform operations based on that information, and take an action or provide additional information in response. The computing devices may be, or include, a processor that is capable of receiving one or more electrical signals representing information expressed as a numerical value as input, determine a numerical value based on the input in accordance with instructions, and provide one or more electrical signals that represent the determined numerical value as output. Device 110 includes processor 111, which may be a publicly available central processing unit (CPU), application-specific integrated circuit (ASIC) or field-programmable gate array.

The instructions used by a computing device include any set of one or more instructions that are accessed and executed by the computing device. By way of example, device 110 stores values representing instructions 113 and processor 111 is able to access those values and perform, or cause other components of device 110 or system 100 to perform, operations associated with those instructions. Instructions 113 may be stored in a format that capable of execution by processor 111 with or without additional processing, e.g., machine code, object code, script, or independent source code modules that are interpreted on demand. An operation expressed as a single instruction in one format may correspond with multiple instructions in another format, e.g., executing a single command in script may require the execution of multiple machine code instructions. Some of the operations described herein may involve the execution of instructions provided by an operating system.

The instructions may be stored in a memory. For instance, instructions 113 are stored in memory 112. The memory may be any component that is capable of storing information on a non-transitory storage medium that can be read by a computing device, e.g., registers provided by processor 111, volatile memory such as RAM (random-access memory), non-volatile memory such as flash memory (e.g., a Secure Digital (SD) card), a hard-disk drive, a solid-state drive, optical storage, or tape backups. Device 110, processor 111 and memory 112 are configured so that processor 111 can read, modify, delete and add values stored in memory 112. Memory may be configured to provide less access than the example of memory 112, e.g., the memory may be read-only.

Memory may store information that is used by, or results from, the operations performed by the computing device. By way of example, memory 112 stores data 114, which includes values that are retrieved or stored by processor 111 in accordance with instructions 113, such as information that is required or determined by device 110 when performing some of the operations described herein. Values stored in memory 112 may be stored in accordance with one or more data structures. For instance, a value stored in memory 112 may represent a single numeric value (e.g., a binary number, an integer, a floating point number, a Unicode value representing a single character of text, digit or punctuation mark, or a value representing a single machine code instruction), a set of multiple numeric values (e.g., an array of numbers, a string of text characters, XML-formatted data, or a file), or information from which values to be processed in accordance with instructions 113 may be obtained (e.g., a reference to a value stored at a remote location or a parameter of a function from which the required value is calculated).

A computing device may include components for receiving information from the physical environment surrounding the device to allow direct user input to the device. Similar to device 110, device 120 includes a processor 121, memory 122, instructions 123 and data 124. Device 120 also includes components that detect information relating to the physical environment in which the component is disposed, and this information may include information provided by user 150. Device 110 includes a user input component 125 having circuitry and other components configured to receive input from user 150, such as information provided tactilely (e.g., a mouse, keyboard, keypad, button or touchscreen). User input components may perform functions that are not primarily directed to user input. By way of example, camera 127 may be used to capture user commands (e.g., hand gestures) and other visual information (e.g., the visual characteristics of a mountain). Microphone 126 may be used to capture user commands (e.g., verbal commands) and other audio information (e.g., the sound of a waterfall).

A computing device may include components for providing information via the physical environment surrounding the device to provide output directly to users. For example, a component may include circuitry that outputs visual, audio or tactile (e.g., haptic) information to users of the device, such as display 130 (e.g., a computer monitor, a touchscreen, a projector or another component that is operable to change a visual characteristic in response to a signal), speaker 128, or actuator 129 to vibrate the device.

A computing device may include one or more components for communicating with other computing devices. By way of example, devices 110, 120 and 140 include circuitry (e.g., a network interface) connecting each device to a different node of communication network 190. Network 190 may be composed of multiple networks using different communication protocols. For instance, when device 110 transmits information to device 120, the information may be sent over one or more of the Internet (e.g., via core Internet routers in accordance with the Transmission Control Protocol (TCP) and Internet Protocol (IP)), a cellular network (e.g., in accordance with the LTE (Long-Term Evolution) standard), a local network (e.g., an Ethernet or Wi-Fi network), or a Bluetooth connection. A device may provide information to a user via other devices, e.g., device 110 may display information to user 150 by sending the information via network 190 to device 120 for display on display 130. A computing device may also provide information to another computing device without the use of a network. By way of example, one computing device may output information with a display and another computing device may detect that information with a camera. Although only a few computing devices are depicted in FIG. 1, the system may include a large number of computing devices that are connected to the network at a large number of nodes.

Although FIG. 1 shows computing devices 110 and 120 as individual blocks, each of which contains its own processor and memory, operations described herein may involve a single computing device or many computing devices (e.g., in the "cloud"). For example, various operations described below as involving a single computing device (e.g., a single CPU in a single server) may involve a plurality of computing devices (e.g., multiple processors in a load-balanced server farm or otherwise having a distributed configuration). Similarly, memory components at different locations may store different portions of instructions 113 and collectively form a medium for storing the instructions. By way of further example, operations described as involving a plurality of computing devices may be performed by a single computing device, e.g., rather than sending data to device 110 for processing, device 120 may process the data itself. Alternatively, device 120 may function as a "thin" client wherein device 110 performs all or nearly all operations that are not directly related to receiving and providing information to user 150 via user input component 125 and display 130. Various operations described herein as being performed by a computing device may be performed by a virtual machine. By way of example, instructions 113 may be specific to a Windows server, but the relevant operations may be performed by a Linux server running a hypervisor that emulates a Windows server. The operations may also be performed by a container, e.g., a computing environment that does not rely on an operating system tied to specific types of hardware.

In some of the examples described herein, device 110 may be a server and devices 120 and 140 may be client devices. For instance, device 110 may be a web server and device 120 may be a desktop computer system, e.g., processor 121 and memory 122 may be contained in a desktop personal computer, display 130 may be an external monitor connected to the computer by a cable, and user input component 125 may be an external keyboard that communicates with the computer via Bluetooth. Alternatively, device 120 may be a wireless phone with a touchscreen that functions as both display 130 and user input component 125. Other client devices may include, by way of example, laptops, notebooks, netbooks, tablets, set-top boxes (e.g., a cable-television set-top box connected to a television) and wearable devices (e.g., a smartwatch). In that regard, a computing device may include other components that are typically present in such devices or general purpose computers but are not expressly described herein.

The system's memory may store shapes that are used to define target areas of a GUI. By way of example, a defining shape be a vertical line or horizontal line that is parallel to the top and bottom edges, or left and right edges, of a screen displaying the GUI, respectively. In addition to horizontal and vertical lines, defining shapes may also include open and closed curvilinear shapes such as diagonal lines, curves, rectangles, circles and combinations of the foregoing.

Defining shapes may be represented in memory based on their shape and location. For example, a defining shape stored as a pair of coordinates may indicate that the shape is a line with endpoints at the pixel or relative x-y positions of the stored coordinates.

Defining shapes may be used to identify a region of the GUI in which a graphic element may be displayed. Graphic elements may have visual characteristics that are based on user-selectable content, such as user-generated text or imagery (e.g., a drawing, photo or video) stored on devices 110 or 120. Graphic elements may also have visual characteristics that are defined by the system, e.g., the color and width of window borders. The borders of a window may be visible or invisible.

Example Methods

Operations in accordance with a variety of aspects of the method will now be described. It should be understood that the following operations do not have to be performed in the precise order described below. Rather, various steps can be handled in a different order or simultaneously.

FIG. 2 provides an example of defining shapes associated with a GUI. Top defining line 210 and bottom defining line 211 are horizontal and parallel to top edge 200 and bottom edge 201 of GUI 222, and left defining line 212 and right defining line 213 are vertical and parallel to left edge 202 and right edge 203 of GUI 222. Edges 200-03 of GUI 222 may correspond with all or a portion of the displayable area of display 130 of device 120. Defining shapes may or may not include the edges of a GUI; for purposes of illustration, GUI edges 200-03 are also defining shapes.

Figure 3:
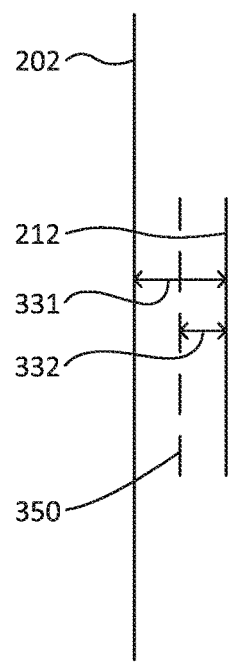
FIG. 3 is an example of determining a portion of the boundary of a defined area based on parallel defining lines.

A defining shape may be associated with a specific portion of the GUI that is defined, at least in part, on the location of the shape (the shape's "defined area"). For instance, the defined area of a defining shape may be the portion of the GUI that is closer to the defining shape than any other defining shape. As shown in FIG. 3, left edge 202 is closer to left defining line 212 than any other defining shape. As a result, the defined area of left defining line 212 may extend leftward for a distance that is half (dimension line 332) of the total distance (dimension line 331) between the line and the edge. Although right defining line 213 is the closest vertical line to the right of left defining line 212, its location will not affect the boundary of the defined area associated with left defining line 212 because of the presence of closer non-parallel defining lines.

Figure 4:
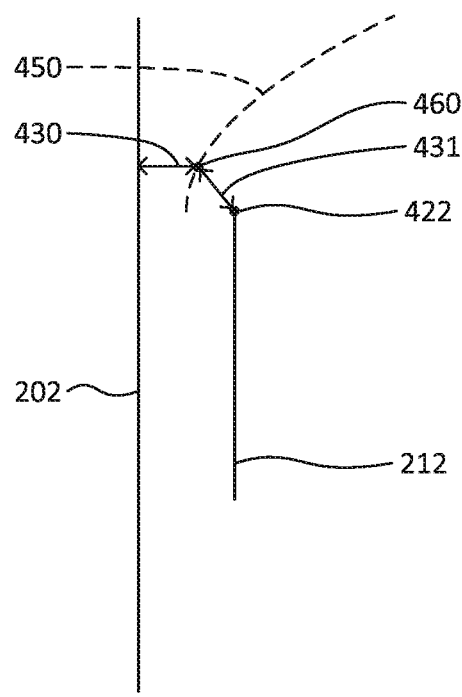
FIG. 4 is an example of determining a portion of the boundary of a defined area based on defining lines.
Figure 5:
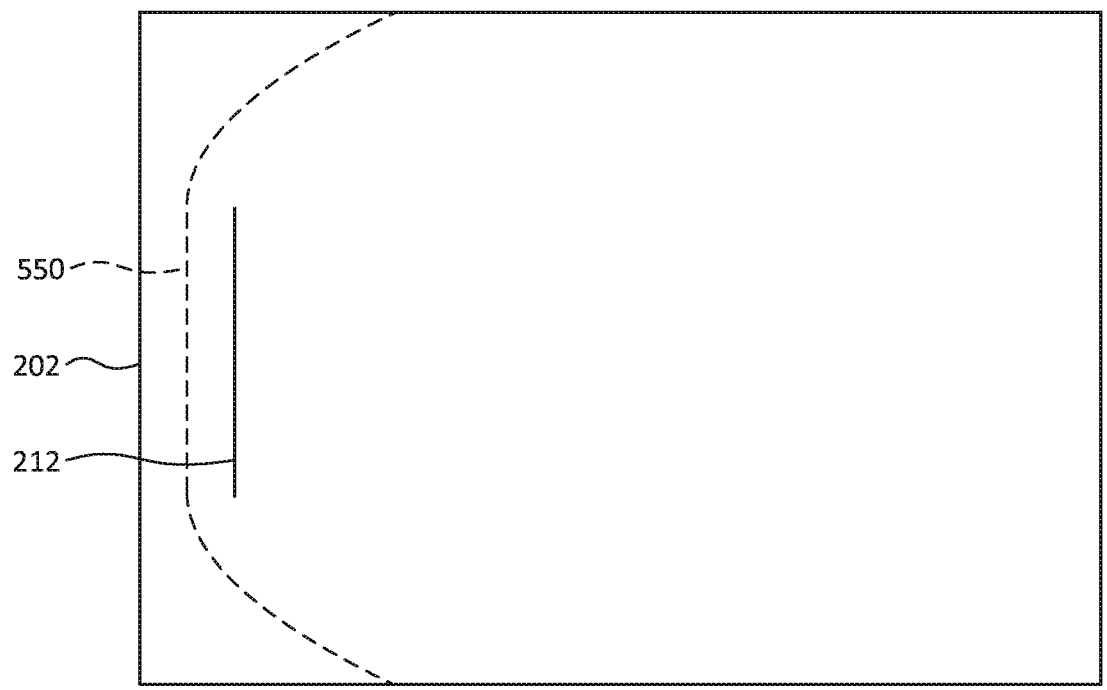
FIG. 5 is an example of a portion of the boundary of a defined area based on defining lines.

One or more portions of the boundary of a defined area may be curved even if all of the defining shapes are lines. FIG. 4 illustrates another portion of the boundary of the left defining line's defined area. Curve 450 represents all of the points that are above left defining line 212 and equally distant from the closest point on left defining line 212, namely endpoint 422, and the closest point on left edge 202. By way of example, the distance from point 460 to left edge 202 (dimension line 430) is the same distance from point 460 to left defining line 212 (dimension line 431). The portion of the GUI that is immediately below boundary 450 will thus be closer to left defining line 212 than left edge 202. FIG. 5 illustrates the entire curvilinear boundary 550 defined by left defining line 212 relative to left edge 202.

Figure 6:
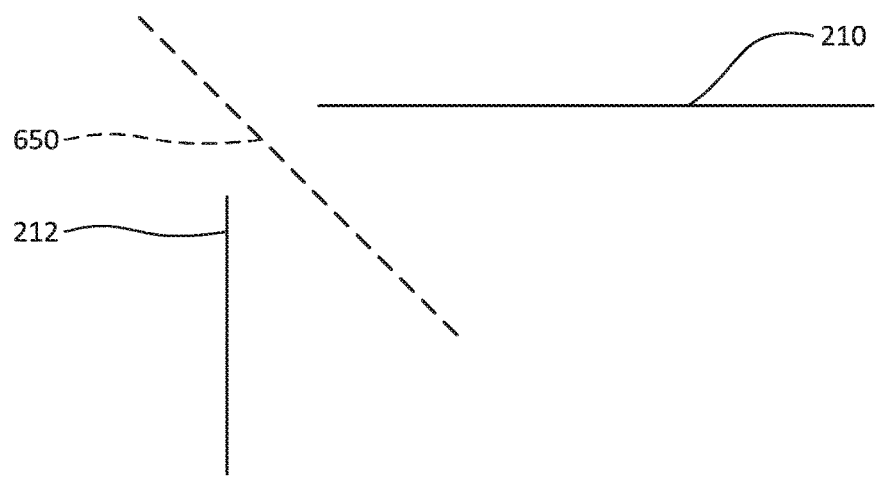
FIG. 6 is an example of determining a portion of the boundary of a defined area based on non-parallel defining lines.

A defining shape's defined area may depend on a plurality of other defining shapes. As shown in FIG. 6, diagonal boundary line 650 represents points in the GUI that are equally distant from left defining line 212 and top defining line 210. As a result, points in the GUI that are immediately below boundary line 650 are closer to left defining line 212 than top defining line 210.

Figure 7:
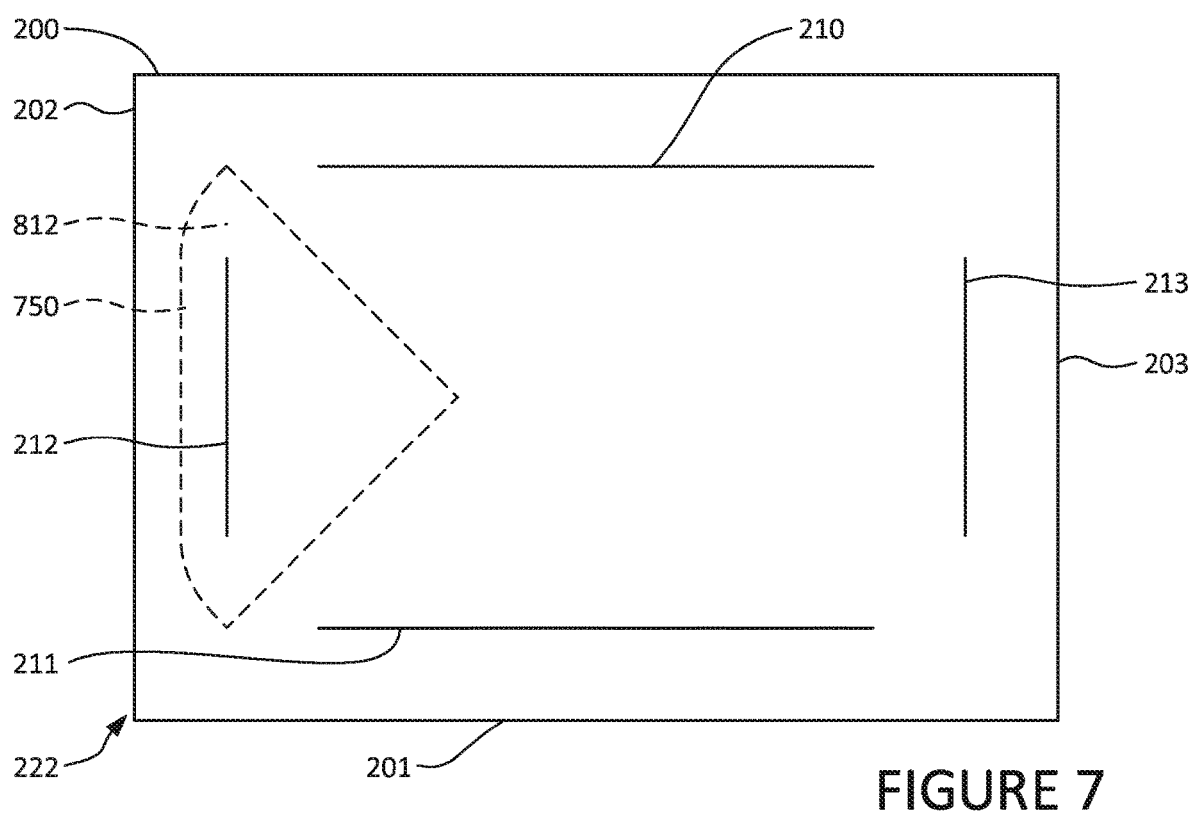
FIG. 7 is an example of a defining area associated with a defining shape.
Figure 8:
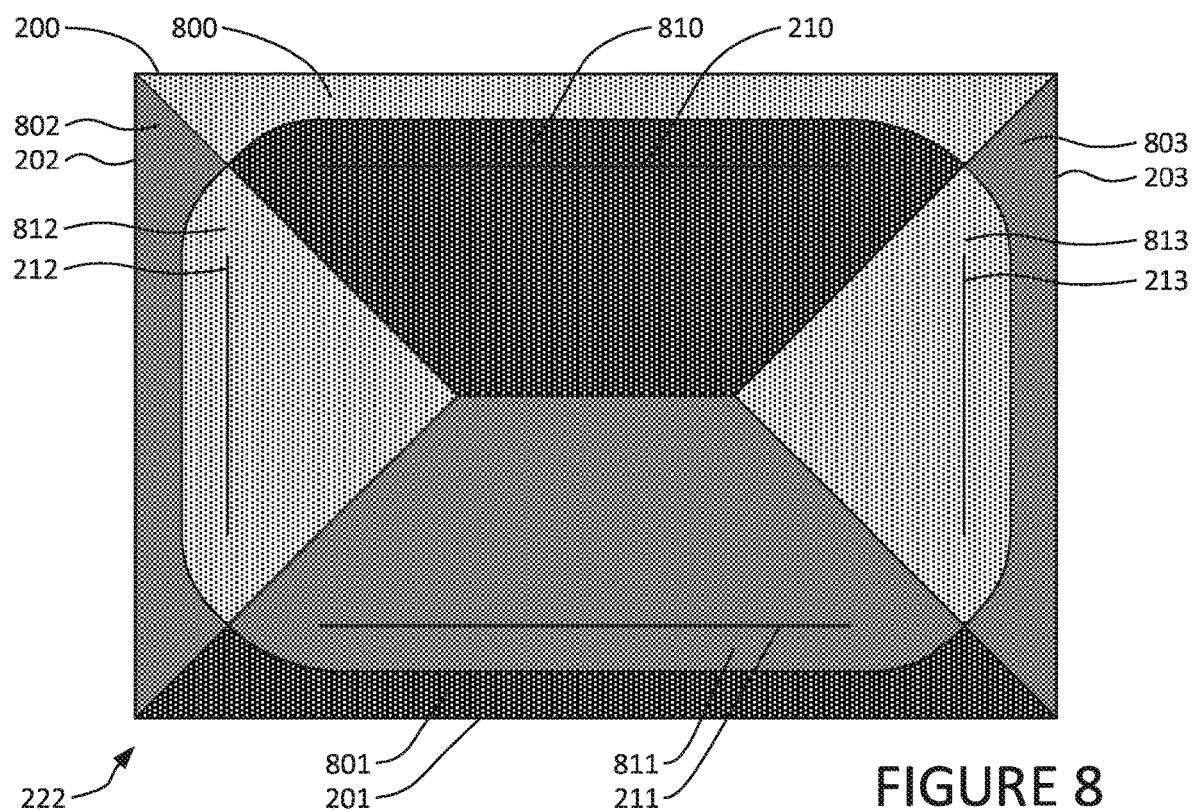
FIG. 8 is an example of multiple defining areas associated with multiple defining shapes.

FIG. 7 illustrates the entire boundary of the left defining line's defined area. Defined area 812 within boundary 750 represents all of the points in GUI 222 that are closer to defining line 212 than any other defining shape. Boundary 750 includes boundaries 350, 450, 550 and 650 shown in FIGS. 3-6, as well as a portion that is based on the location of left defining line 212 relative to bottom defining line 211.

Each point within a GUI may be associated with a specific defining shape and defined area. As shown in FIG. 8, defined area 800 contains all of the points in GUI 222 that are closer to top edge 200 than defining lines 201-03 and 210-13. Similarly, defined areas 801-03 and 810-13 contain all of the points in GUI 222 that are closer to defining lines 201-03 and 210-13, respectively, than any other defining line.

The system may determine whether a location is within a specific defined area by identifying the closest defining shape to the location. For example, if a user-selected position is expressed as a point, the system may calculate the distance between that point and the closest point on each defining line, and then identify the defining line with the shortest calculated distance to the point as the closest defining line. By way of example and as shown in FIGS. 9 and 10, the system may determine that location 950 is in defined area 812 of left defining line 212 and that location 1050 is in the defined area 810 of top defining line 210. Determining the closest point to the defining shape may also include estimating the closest point to the location, particularly if the defining shape is more complex than lines between two endpoints.

A user may use defining shapes and defined areas to arrange graphic elements containing user-selected content. As shown in FIGS. 1 and 11, user 150 may operate user input component 125 of device 120 to request certain content items stored in memory 112 of device 110 via network 190. In response to the request, device 110 may provide a description of content items for display on display 130 via browser 1100, such as text (e.g., the name of the content) and graphics (e.g., an icon). As shown in FIG. 12, the user may drag "Content A" icon 1101 onto "Content B" icon 1102, and icon 1102 may expand to include icon 1101 to indicate that content from "Content A" and "Content B" will be displayed in different windows at the same time in the same GUI. Device 120 may receive the content associated with icons 1101 and 1102 from device 110.

A user may select a location for a graphic element by selecting a defined area. By way of example and as shown in FIG. 13, GUI 1113 of browser 1100 may display the content in windows 1302 and 1303, respectively, in the portion of the browser for displaying user-selected content (GUI 1113). A user may select a location for window 1302 containing "Content A" by selecting the window and tapping at location 1350 or dragging the window with a mouse (or their finger) until the cursor reaches location 1350. Location 1350 of FIG. 13 corresponds with location 950 of FIG. 9 which, as noted above, is located in defined area 812.

The system may use defining shapes to determine a location for multiple graphic elements based on a single user-selected graphic element and a single user-selected location. As shown in FIGS. 9 and 13, since there are two windows to be displayed in browser 1100, the system may divide GUI 222/1113 into left and right halves at boundary line 970 and display selected window 1302 in the half containing selected defined area 812, e.g., the left half. The location of the non-selected graphic element (e.g., window 1303) may be a region of the GUI that does not overlap with the location of the selected graphic element, e.g., the right half of GUI 222/1113. As shown in FIG. 14, the borders of each window may be located at or near the outer boundary of its determined region. Similarly, as shown in FIGS. 10 and 15, if the user drags window 1302 to location 1050/1550 in defined area 810, the system may divide the GUI into top and bottom halves at boundary line 1070 and display window 1302 in the top half containing defined area 810 and display window 1303 in the other half (e.g., the bottom half).

As a user selects different defined areas in the GUI, the system may provide a preview of the arrangement associated with that defined area. For instance, as shown in FIG. 13, when the user drags window 1302 to location 1350, the system may display outline 1321 to indicate the location of the window if dropped there. The system may also show a greyed version of window 1303 to indicate its location if window 1302 is dropped at location 1350.

The system may dynamically modify defining shapes by removing or relocating existing defining shapes or adding new ones. For instance, the system may modify or create defining shapes in response to a user selecting a particular arrangement of graphic elements. FIG. 16 provides an example of two windows 1650 and 1651 that were arranged as described above in connection with FIGS. 11-14. After the user selects their locations, the system may associate GUI 1113 with new defining lines based on the final location of the two windows. By way of example, the endpoints of newly created defining lines 1670-73 may be located a predetermined distance within the borders of window 1602, such as a fixed pixel length from the borders or a fixed percentage of the window's dimensions. Moreover, top, bottom, left and right defining lines 1610-13 may have been moved closer to the edges of GUI 1113 based on the final location of windows 1650-51. For ease of reference, FIG. 17 illustrates the locations of the newly-created defining lines relative to edges 200-03, and an oversimplified representation of defined area 1750 associated with defining line 1670.

The dynamically-created defining lines may be used to select a new arrangement when another graphic element is added to the GUI. FIG. 18 illustrates the addition of a new window 1652. For example, window 1652 may have been added in response to a user selecting icon 1103 associated with "Content C" (FIG. 11). When the location of cursor 1850 is closer to defining line 1670 than any other defining line currently associated with the GUI, the system may determine an arrangement for windows 1650-52 similar to the manner described above in connection with FIGS. 9-10 and 13-15. For instance, the system may divide the left half of the GUI into a top and bottom half and display window 1652 in top-left region 1821 containing defined area 1750. The location of window 1650 may be changed to the bottom-left region of the GUI, and the location of window 1651 may remain in place. FIG. 19 provides another example of an arrangement that may result from the user selecting defined area 1750 as the location for window 1652.

The system may use a variety of criteria for determining how to divide the GUI into regions for displaying graphic elements in response to a user's selection of a defined area. For instance, the regions may be determined based on a minimum region size such that a large region can be split into two if its width or right is equal to or greater than twice the minimum region size in that dimension. By way of further example, the system may determine region locations based on one or more of the following criteria: (a) at least one region contains all or substantially all of the defining shape that is closest to the user-selected location, or all or substantially all of such defining shape's defined area; (b) the regions collectively occupy all or substantially all of the entire displayable area; (c) some or all regions are equally sized; (d) a landscape GUI is split into columns and a portrait GUI is split into rows; (e) regions are offset a small distance from the edges of the GUI and other regions, and (f) the criteria is applied recursively, e.g., the GUI is initially split into large regions and each region is split into smaller regions as necessary in accordance with the foregoing criteria.

FIG. 20 provides another example of dynamically determined defining shapes, e.g., equally sized and oriented defining lines within a threshold distance of each other may be replaced with a single defining line. For example, defining lines 2001 and 2002 may be replaced with defining line 2050.

Relatively small changes in a user-selected location may result in relatively significant differences in graphic element arrangements. The dotted lines and black dots in diagrams 2150-2152 of FIG. 21 correspond with defining lines 2050-52 and user-selected locations A-C in FIG. 20, respectively. Although user-selected locations A-C are relatively close to each other, defining line 2050 is the closest defining line to location A, defining line 2051 is the closest defining line to location B, and defining line 2052 is the closest defining line to location C. As a result, since each user-selected location A-C is located in a different defined area, the resulting arrangements shown in diagrams 2150-2152 are also different.

The location of a graphic element may be further based on properties of a defining shape that are not specific to the shape's location. For example and as shown in FIGS. 22 and 23, defined area 800 may be associated with top edge 200 and top edge 200 may be associated with a property related to tabbed formats. When cursor 2250 is moved within defined area 800, the system may display an outline 2260 indicating that selecting the current location will result in all of the windows being placed in tabbed format 2360 as shown in FIG. 23.

Figure 24:
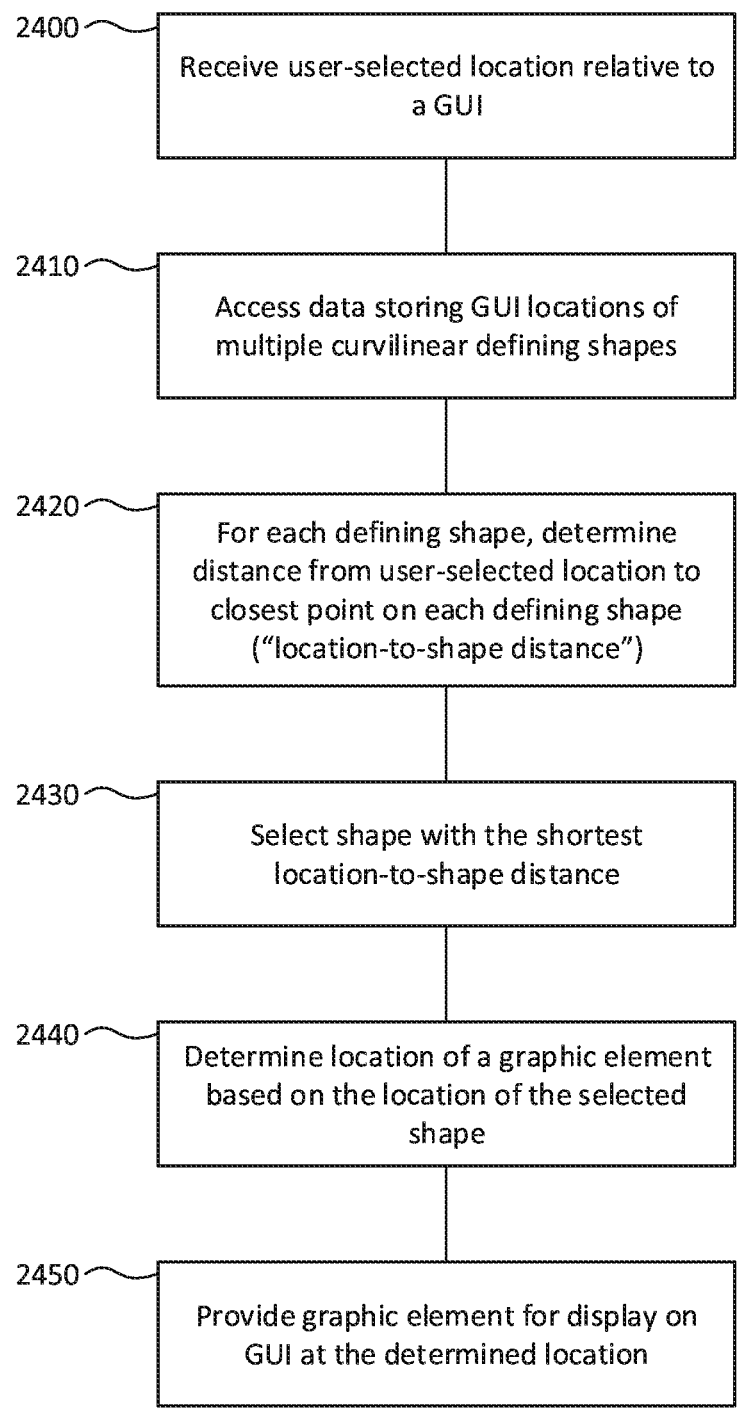
FIG. 24 is a flow diagram in accordance with aspects of the disclosure.

FIG. 24 is a flowchart describing some of the features described above. At block 2400, a user-selected location relative to the GUI is received. At block 2410, data storing GUI locations of multiple curvilinear defining shapes is accessed. At block 2420, for each defining shape, the distance from user-selected location to the closest point on each defining shape is determined ("location-to-shape distance"). At block 2430, the shape with the shortest location-to-shape-distance is selected. At block 2440, the location of a graphic element based on the location of the selected shape is determined. At block 2450, the graphic element is provided for display on GUI at the determined location.

As these and other variations and combinations of the features discussed above can be utilized without departing from the claimed subject matter, the foregoing description of the embodiments should be taken by way of illustration rather than by way of limitation. The provision of examples (as well as clauses phrased as "such as," "e.g.", "including" and the like) should not be interpreted as limiting the claims to the specific examples; rather, the examples are intended to illustrate only some of many possible aspects. Similarly, references to "based on" and the like means "based at least in part on".

The invention claimed is:

1. A system comprising:
one or more computing devices; and
memory storing instructions and data, the instructions being executable by the one or more computing devices, the data comprising a first location of a curvilinear first shape relative to a graphical user interface and a second location of a curvilinear second shape relative to the graphical user interface, wherein the curvilinear first shape and the curvilinear second shape define a display area of the graphical user interface;

wherein the instructions comprise receiving a selection of content that is displayable in the graphical user interface as a plurality of graphic elements;

receiving a selected location relative to the graphical user interface, the selected location being a point on the graphical user interface;

determining a first distance between the selected location and the closest point on the first shape to the selected location, determining a second distance between the selected location and the closest point on the second shape to the selected location, selecting the first shape when the first distance is shorter than the second distance and selecting the second shape when the second distance is shorter than the first distance, determining a first graphic element location for a first graphic element of the plurality of graphic elements and a second graphic element location for a second graphic element of the plurality of graphic elements based on the location of the selected shape, and providing the first graphic element and the second graphic element for display on the display area of the graphical user interface at the graphic element location.

2. The system of claim 1 wherein the first shape is a horizontal or vertical line and the second shape is a horizontal or vertical line.

3. The system of claim 2 wherein the graphical user interface has outer edges, the first shape and second shape have endpoints, and the distance between each endpoint and the outer edges is greater than zero.

4. The system of claim 1 wherein the first graphic element is a window having a location defined by visible borders, the selected location is based on a user dragging the window, and the location of the window corresponds with the first graphic element location when the user drops the window.

5. The system of claim 4 wherein the instructions further comprise providing a preview of the first graphic element location as the window is dragged.

6. The system of claim 1 wherein the first graphic element location is based on a portion of the graphical user interface that is closer to the shape that was selected than the shape that was not selected.

7. The system of claim 1 wherein the instructions further comprise determining the second graphic element location as a location that does not overlap with the first graphic element location.

8. The system of claim 1 wherein the instructions further comprise:

determining a third location for a curvilinear third shape based on the first graphic element location, receiving another selected location relative to the graphical user interface, when said another selected location is closer to the third location than the first location or the second location, providing a third graphic element for display on the graphical user interface at a third graphic element location that is determined based on the third location.

9. The system of claim 8 wherein:

the graphic elements are windows;

the first graphic element location comprises a first half of the graphical user interface and the second graphic element location comprises the other half of the graphical user interface;

the third graphic element location comprises half of the first half; and after the third graphic element location is determined, the first graphic element location is changed to the other half of the first half of the graphical user interface.

10. A system comprising:

one or more computing devices; and memory storing instructions and data, the instructions being executable by the one or more computing devices, the data comprising a plurality of defining shapes wherein each defining shape has a location and is associated with a portion of a graphic user interface that is based on the location of the defining shape relative to the location of at least one other defining shape;

wherein the instructions comprise:

receiving a selection of content that is displayable in the graphical user interface as a plurality of graphic elements, receiving a user-selected location, the selected location being a point on the graphical user interface, identifying the defining shape associated with the portion of the graphical user interface in which the user-selected location is associated, determining a first location of a first graphic element of the plurality of graphic elements based on the location of the identified defining shape, determining a second location of a second graphic element of the plurality of graphic elements that does not overlap with the first location of the first graphic element, determining a location of a new defining shape based on the first location of the first graphic element, storing the location of the new defining shape, and providing the first graphic element and second graphic element for display.

11. The system of claim 10 wherein the location of the new defining shape is within the first location of the first graphic element.

12. The system of claim 11 wherein the location of the new defining shape is offset from a boundary of the first location of the first graphic element.

13. The system of claim 10 wherein the first graphic element and the second graphic element are windows with borders and the defining shapes are lines having endpoints within the graphical user interface.

14. The system of claim 13 wherein the endpoints of the new defining shape are contained within the first location of the first graphic element and a non-zero distance from each border of the window.

15. The system of claim 13 wherein the new defining shape is offset from and parallel to at least one border of the window comprising the first graphic element.

16. The system of claim 10 wherein the instructions further comprise receiving a plurality of user-selected locations, each user-selected location of said plurality of user-selected locations being associated with a new graphic element to be displayed, and adding the location of a new defining shape to the memory in response to determining a location of a new graphic element to be displayed.

17. A method comprising:

receiving, using one or more computing devices, a selection of a plurality of windows with borders;

identifying, using the one or more computing devices, a first window of the plurality of windows selected via a user input component;

receiving a location via the user input component, the received location being a point on a graphical user interface;

determining, using the one or more computing devices and for each line of a plurality of lines, the shortest distance between a line of the plurality of lines and the received location;

identifying, using the one or more computing devices and based on the shortest distance determined for each line, the line that is closer to the received location than any other line of the plurality of lines; and providing for display, using the one or more computing devices, the plurality of windows wherein a border of the first window contains the identified line, and wherein each other window of the plurality of windows is at a location that does not overlap with any other window.

18. The method of claim 17 wherein the plurality of lines are not visible.

19. The method of claim 17 wherein at least one line of the plurality of lines is a non-zero distance from borders of all of the windows.

20. The method of claim 17 wherein identifying the first window of the plurality of windows selected via the user input component comprises identifying a window being dragged; and wherein receiving the location via the user input component comprises identifying the location of a cursor dragging the window being the point on the graphical user interface.

* * * * *

UNITED STATES PATENT AND TRADEMARK OFFICE
CERTIFICATE OF CORRECTION

PATENT NO. : 10,528,215 B2
APPLICATION NO. : 15/630159
DATED : January 7, 2020
INVENTOR(S) : Andrew Wilson Page 1 of 1

It is certified that error appears in the above-identified patent and that said Letters Patent is hereby corrected as shown below:

In the Claims

Column 11, Line 3, Claim 1:
Now reads: "user interface;"; should read -- user interface; and --.

Column 11, Line 4, Claim 1:
Now reads: "comprise"; should read -- comprise: --.

Column 11, Lines 6-7, Claim 1:
Now reads: "graphic elements;"; should read -- graphic elements, --.

Column 11, Line 10, Claim 1:
Now reads: "user interface;"; should read -- user interface, --.

Column 14, Line 5, Claim 18:
Now reads: "are not visible"; should read -- is not visible --.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*